US009843602B2

(12) United States Patent
Tsao et al.

(10) Patent No.: US 9,843,602 B2
(45) Date of Patent: Dec. 12, 2017

(54) LOGIN FAILURE SEQUENCE FOR DETECTING PHISHING

(71) Applicant: Trend Micro Incorporated, Tokyo (JP)

(72) Inventors: Wen-Kwang Tsao, Taipei (TW); Che-Fu Yeh, Taipei (TW); Hong-Che Lin, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 113 days.

(21) Appl. No.: 15/047,055

(22) Filed: Feb. 18, 2016

(65) Prior Publication Data

US 2017/0244755 A1    Aug. 24, 2017

(51) Int. Cl.
H04L 29/06 (2006.01)

(52) U.S. Cl.
CPC ........ H04L 63/1483 (2013.01); H04L 63/083 (2013.01)

(58) Field of Classification Search
CPC .......................... H04L 63/1483; H04L 63/083
USPC .......................................................... 726/22
See application file for complete search history.

(56) References Cited

U.S. PATENT DOCUMENTS

| | | | |
|---|---|---|---|
| 7,021,534 B1 | 4/2006 | Kiliccote | |
| 7,802,298 B1 * | 9/2010 | Hong | G06F 21/51 |
| | | | 705/51 |
| 8,019,689 B1 * | 9/2011 | Nachenberg | G06Q 10/063 |
| | | | 705/50 |
| 8,776,196 B1 | 7/2014 | Oliver et al. | |
| 2005/0160330 A1 | 7/2005 | Embree et al. | |
| 2006/0064374 A1 | 3/2006 | Helsper et al. | |
| 2006/0070126 A1 | 3/2006 | Grynberg | |
| 2006/0101120 A1 | 5/2006 | Helsper et al. | |
| 2006/0123464 A1 | 6/2006 | Goodman et al. | |
| 2006/0123478 A1 | 6/2006 | Rehfuss et al. | |
| 2006/0168066 A1 | 7/2006 | Helsper et al. | |
| 2007/0112814 A1 | 5/2007 | Cheshire | |
| 2007/0282739 A1 | 12/2007 | Thomsen | |
| 2008/0028444 A1 | 1/2008 | Loesch et al. | |
| 2008/0082662 A1 | 4/2008 | Danliker et al. | |
| 2011/0126289 A1 * | 5/2011 | Yue | G06F 21/554 |
| | | | 726/26 |
| 2014/0359760 A1 * | 12/2014 | Gupta | H04L 63/1408 |
| | | | 726/22 |
| 2015/0381654 A1 * | 12/2015 | Wang | H04L 63/101 |
| | | | 726/23 |

* cited by examiner

Primary Examiner — Baotran N To
(74) Attorney, Agent, or Firm — Okamoto & Benedicto LLP

(57) ABSTRACT

A login page of an online service is received in a user computer. False credentials, such as a false user identifier (ID) and a false password, are entered into the login page to login to the online service. The login page is classified as phishing when the online service does not serve a legitimate login-fail page in response to the entry of the false credentials in the login page.

11 Claims, 7 Drawing Sheets

LOGIN FAILURE SEQUENCE FOR DETECTING PHISHING

BACKGROUND OF THE INVENTION

1. Field of the Invention

The present invention relates generally to computer security, and more particularly but not exclusively to methods and systems for detecting phishing.

2. Description of the Background Art

Various online services are available over the Internet. Examples of these online services include online banking, data storage, webmail, social networks, etc. Generally speaking, an online service may be accessed with appropriate credentials, such as a user identifier (e.g., username, email address, mobile phone number) and a password. An end user may obtain credentials upon creation of an online account with the online service. The online service may maintain a website that serves a webpage for entering credentials, which is referred to as a "login page."

The convenience provided by online services not only attracts legitimate end users but fraudsters as well. Fraudsters may gain access to an online account of a victim using a variety of techniques including by phishing. Phishing is a cyber attack that involves some form of misrepresentation. A fraudster may operate a malicious website or hijack a legitimate website to serve a phishing login page, which is a webpage that mimics the look and feel of a legitimate login page for the purpose of stealing the victim's credentials. The fraudster may direct the victim to the phishing login page by spam email, man-in-the-middle attack, etc. The phishing login page is made to look convincingly real to trick the victim into entering his credentials.

To combat phishing, the characteristics of phishing login pages (e.g., uniform resource locator (URL)) may be compiled in a blacklist. The blacklist may be consulted to determine if a particular login page is phishing, i.e., perpetrating or part of a phishing attack. However, because of the number of phishing login pages continually increase, it is relatively difficult to create and maintain such a blacklist.

SUMMARY

In one embodiment, a login page of an online service is received in a user computer. False credentials, such as a false user identifier (ID) and a false password, are entered into the login page to login to the online service. The login page is classified as phishing when the online service does not serve a legitimate login-fail page in response to the entry of the false credentials in the login page.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
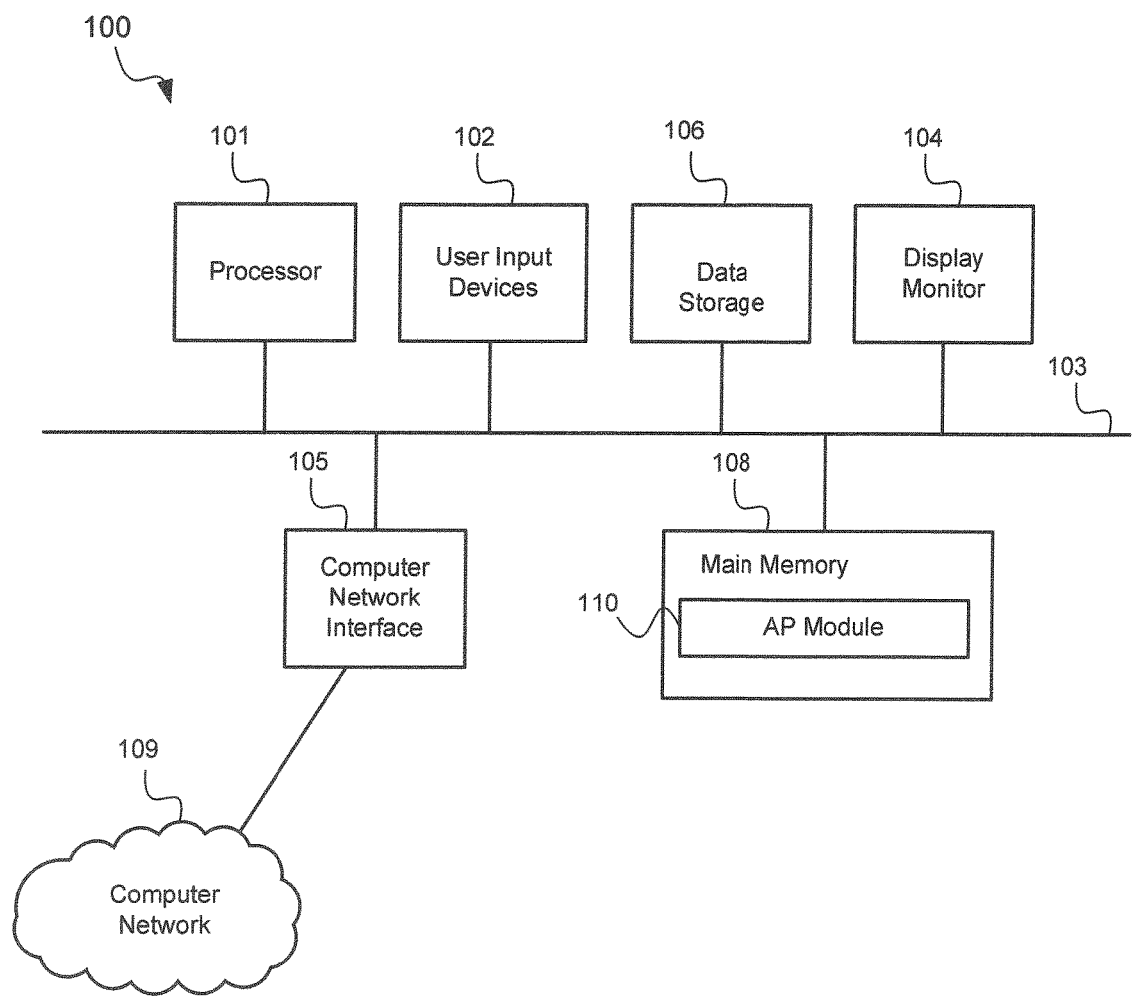
FIG. 1 shows a schematic diagram of a computer system in accordance with an embodiment of the present invention.

Referring now to FIG. 1, there is shown a schematic diagram of a computer system 100 in accordance with an embodiment of the present invention. The computer system 100 may be employed as a user computer, a backend system, and other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101. An article of manufacture may be embodied as computer-readable storage medium including instructions that when executed by the processor 101 of the computer system 100 causes the computer system 100 to be operable to perform the functions of the one or more software modules. In the example of FIG. 1, the computer system 100 includes an anti-phishing module 110 for detecting phishing and similar cyber attacks. The anti-phishing module 110 may comprise a phishing detector when the computer system 100 is employed as a backend system. The anti-phishing module 110 may comprise an anti-phishing agent when the computer system 100 is employed as a user computer.

Figure 2:
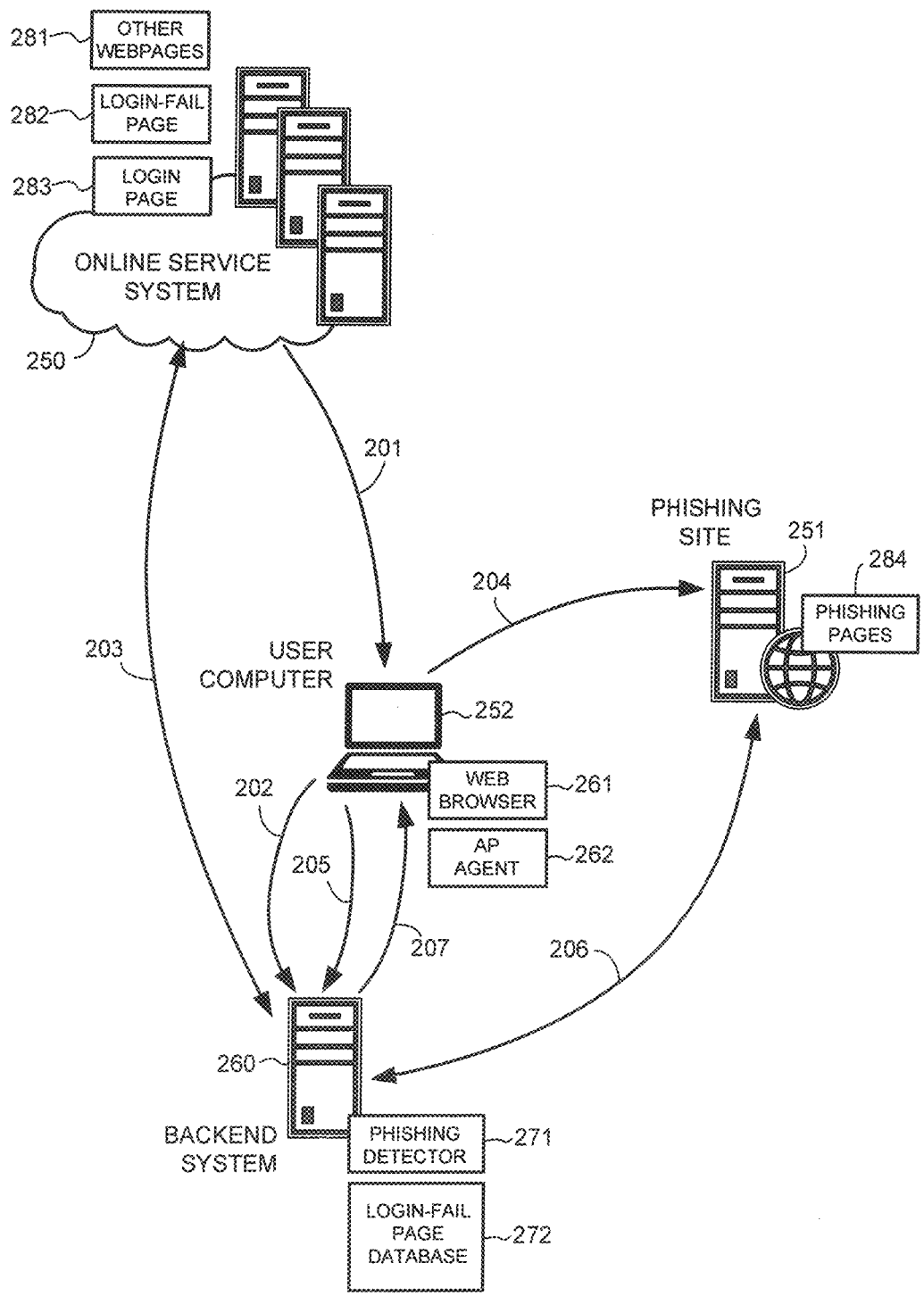
FIG. 2 shows a flow diagram of a system for detecting phishing in accordance with an embodiment of the present invention.

FIG. 2 shows a flow diagram of a system for detecting phishing in accordance with an embodiment of the present invention. In the example of FIG. 2, the phishing detection system includes a one or more user computers 252 and one or more backend systems 260. In one embodiment, a user computer 252 may be any suitable computer that is employed by a user to navigate to a website. A backend system 260 may comprise one or more computers for detecting phishing. A user computer 252 and a backend system 260 may communicate over the Internet.

An online service system 250 may comprise one more computers that host a website for providing a plurality of online services. A user may have an online account with the website to access one or more of the online services. The user may use the same set of credentials to access several online services. To access an online service, the user may employ a web browser 261 to communicate with the online service system 250. In the example of FIG. 2, the online service system 250 hosts and serves a plurality of webpages, such as a login page 283, a login-fail page 282, and other webpages 281.

The online service system 250 may initially serve the login page 283 to the user computer 252 to allow the user to login and be authenticated. Upon receiving credentials on the login page 283, the online service system 250 may serve other webpages to the user computer 252 depending on a variety of factors, including whether or not the credentials are valid, the particular online service being accessed, etc.

Figure 3:
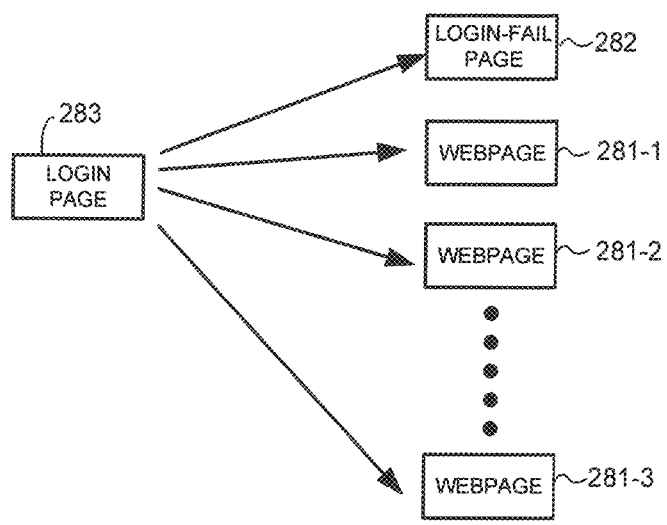
FIG. 3 shows a logical diagram that illustrates sequentially served webpages.

More particularly, as shown in FIG. 3, the online service system 250 may serve the login page 283 when the user logs in to access an online service and thereafter serve the login-fail page 282 when the login is not successful, a webpage 281-1 when the login is successful for a first online service, a webpage 281-2 when the login is successful for a second online service, a webpage 281-3 when the login is successful for a third online service, etc. This is because some online service systems are session-based to provide multiple online services and entry points. For example, when a user does not login or the session is expired, an online service system may redirect the user to a login page, and redirect back to the previous webpage upon a successful login. In that case, the webpage 281 served by the online service system 250 following a successful login may depend on the webpage or session from which the login page 283 was reached. This is further illustrated in FIG. 4 involving the online services provided by GOOGLE Inc.

Figure 4:
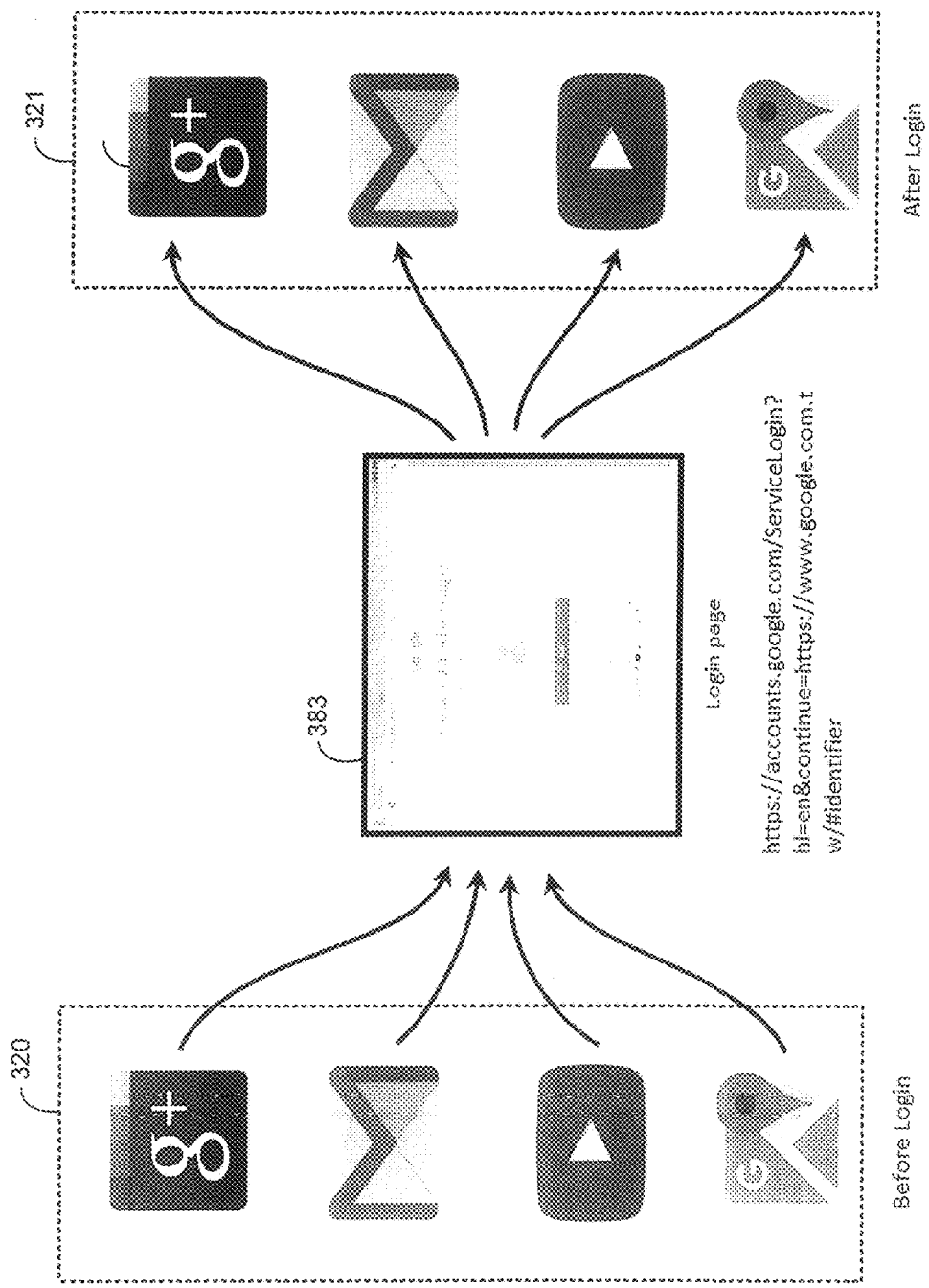
FIGS. 4 and 5 show webpages of an example online service provider.

In the example of FIG. 4, a login page 383 may be reached from different webpages 320 of various online services provided by GOOGLE Inc., such as GOOGLE+ social network, GMAIL email, YOUTUBE video sharing site, GOOGLE MAPS map service. A webpage 320 is also referred to as a "before login page" because it is the webpage that is served right before the login page. A user may be redirected from a webpage 320 to the login page 383. Upon a successful login, i.e., valid credentials were entered into the login page 383, one of different webpages 321 may be served depending on the online service being accessed. A webpage 321 is also referred to as an "after login page" because it is the webpage served right after the login page 383. A webpage 321 is also referred to as a "login-success" page because it is served in response to a successful login. In contrast, a login-fail page is a webpage served in response to a failed login, i.e., invalid credentials were entered into the login page.

Figure 5:
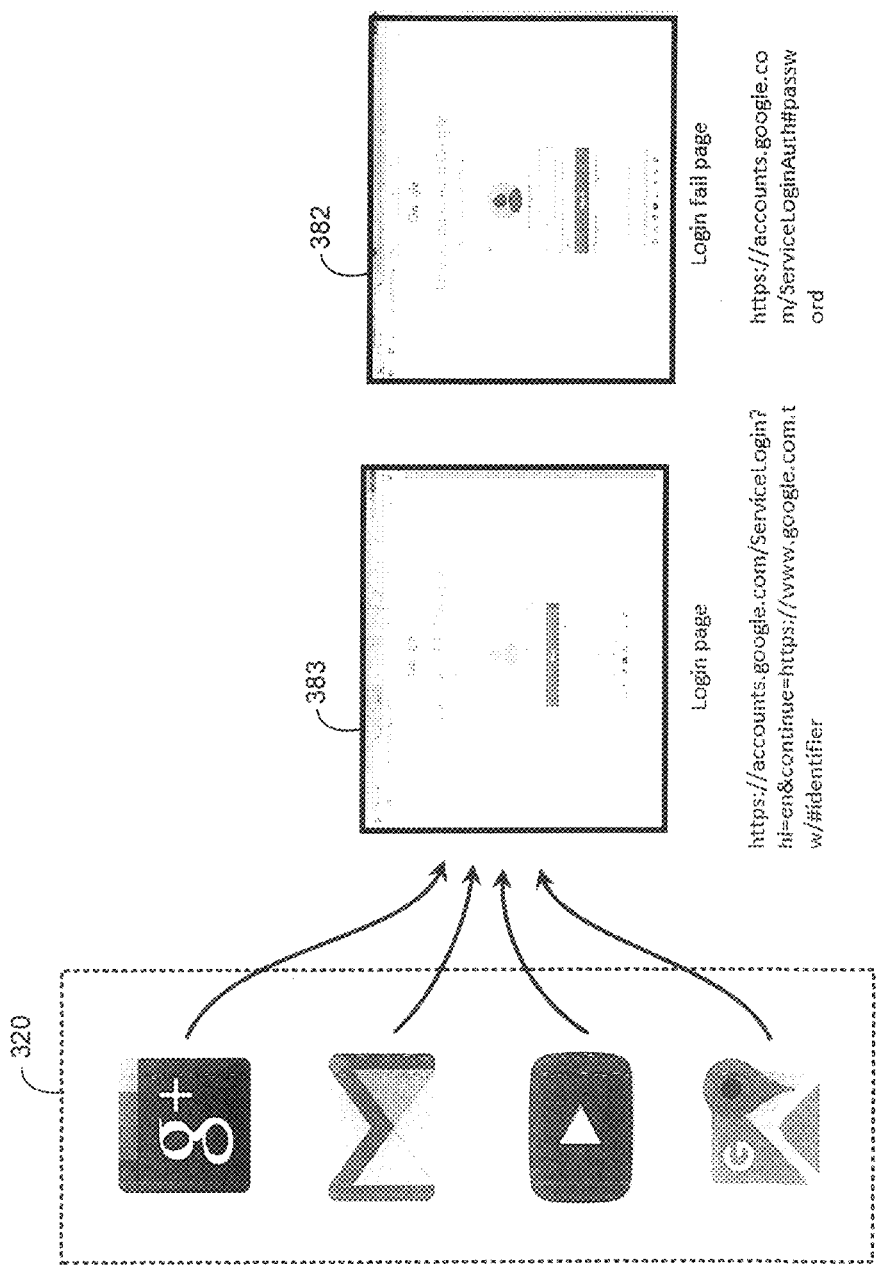

Observations made by the inventors on general Internet network traffic indicate that the sequences of webpages served in successful logins, such as a sequence of before login page, login page, and after login page, are too numerous and are frequently changing. In contrast, the sequences of webpages served in failed logins are much smaller. For example, as illustrated in the example of FIG. 5 involving the online services provided by GOOGLE Inc., the number of after login pages is much more limited in the case of a failed login. More particularly, in the example of FIG. 5, a user may start from one of a plurality of webpages 320 to land on the login page 383, but will receive one (or a much smaller number of) login-fail page 382 upon a failed login.

Referring back to FIG. 2, in an example operation, the user computer 252 employed by the user may receive a login page 283 from the online service system 250 (arrow 201). The login page 283 is displayed on a window of the web browser 261. In one embodiment, the anti-phishing agent 262 is configured to detect when the user computer 252 requests and/or receives a login page. For example, the anti-phishing agent 262 may identify reception of or request for a login page by consulting a local or remote database that includes characteristics (e.g., entry fields for user ID and password) indicative of login pages. In response to detecting that the user computer 252 is requesting for or has received the login page 283, the anti-phishing agent 262 so notifies the backend system 260 (arrow 202). In one embodiment, the notification includes the URL or other network location identifier of the login page 283 to allow the backend system 260 to receive and analyze the login page 283 and to evaluate the behavior of the online service system 250.

In one embodiment, the backend system 260 includes a phishing detector 271 and a login-fail page database 272. In one embodiment, the login-fail page database 272 includes indicators (e.g., URL, hash, etc.) of legitimate login-fail pages, i.e., webpages served by legitimate online services in response to a failed login. As can be appreciated, because the number of sequences of webpages served in failed logins is much smaller than the number of sequences of webpages served in successful logins, the creation, maintenance, and processing of the login-fail page database 272 are relatively manageable, making the login-fail page database 272 practical for use in production environments where webpages are continually evaluated for phishing. The phishing detector 271 may be configured to consult the login-fail page database 272 to determine if a particular login page is legitimate.

In the example of FIG. 2, in response to the notification from the anti-phishing agent 262, the phishing detector 271 communicates with the online service system 250 to receive the login page 283 and enter false credentials (e.g., randomly generated user identification (ID) and password) in the login page 283 (arrow 203). The phishing detector 271 may deem the login page 283 to be a phishing page based on whether or not the online service system 250 accepts the false credentials as valid and whether or not the online service system 250 serves a legitimate login-fail page 282 in response to the entry of the false credentials in the login page 283.

In the example of FIG. 2, the online service system 250 hosts a legitimate website and accordingly recognizes that the false credentials are not valid. Consequently, in response, the online service system 250 serves the login-fail page 282, which is a legitimate login-fail page that is indicated as such in the login-fail page database 272. The phishing detector 271 receives the login-fail page 282, and recognizes that the sequence of consecutively served webpages consisting of the login page 283 followed by the login-fail page 282 indicates that the online service system 250 does not appear to be hosting a phishing website. The phishing detector 271 consults the login-fail page database 272 for confirmation, and finds that the login-fail page 282 has the characteristics of an authentic login-fail page of a legitimate website that is known to serve the login-fail page 282 after the login page 283 in response to a failed login. Accordingly, the phishing detector 271 classifies the login page 283, and the website hosted by the online service system 250, as legitimate.

Legitimate websites and phishing sites abound on the Internet. In the example of FIG. 2, a phishing site 251 is a website for perpetrating a phishing attack. To that end, the phishing site 251 maintains a plurality of phishing pages 284 for stealing confidential information from unsuspecting users. The phishing pages 284 may comprise phishing login pages, phishing login-fail pages, phishing login-success pages, and other phishing pages.

The user computer 252 may request for or receive a phishing login page from the phishing site 251 (arrow 204). The user computer 252 may be redirected to receive and display the phishing login page on the web browser 261 when the user unknowingly clicks on a link of a phishing email, inadvertently navigates to the phishing site 251, etc. The anti-phishing agent 262 recognizes the phishing page as a login page, e.g., because of user ID and password entry fields in the phishing page, and, in response, so notifies the backend system 260 (arrow 205). The notification includes the URL or other network location identifier of the phishing page.

Figure 6:
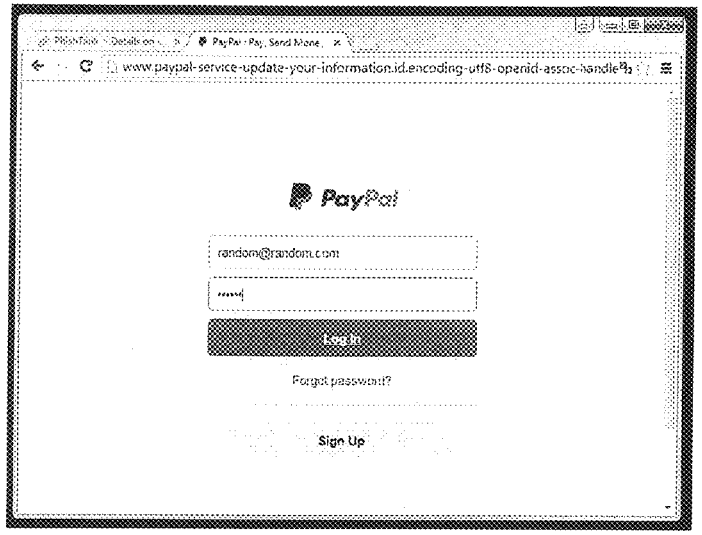
FIGS. 6 and 7 show an example phishing login page and an example phishing login-fail page, respectively.
Figure 7:
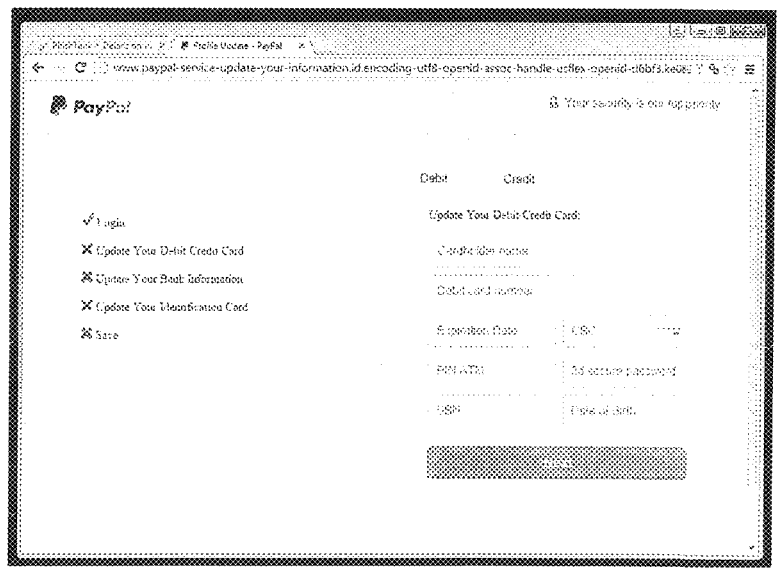

In the example of FIG. 2, in response to the notification from the anti-phishing agent 262, the phishing detector 271 communicates with the phishing site 251 to receive the phishing login page and enter false credentials in the phishing page (arrow 206). The phishing site 251 has no information on whether or not credentials entered in the phishing page are valid. Accordingly, the phishing site 251 (and in general, most phishing sites) simply accepts the false credentials as valid and serves a login-success page indicating a successful login. FIG. 6 shows an example phishing login page that mimics the login page of the PAYPAL online payment service. FIG. 7 shows a phishing login-success page that is served even when false credentials are entered into the phishing login page of FIG. 6.

In the example of FIG. 2, the phishing detector 271 recognizes that the after login page is a login-success page, e.g., by scanning the after login page for keywords or other characteristics indicative of a successful login. In response to receiving the login-success page despite the false credentials, the phishing detector 271 classifies the phishing page as a phishing page.

It is possible that the phishing site 251 may return a phishing login-fail page in response to the false credentials, such as when the phishing site 251 is configured to automatically reject an initial login attempt to avoid detection. Accordingly, the phishing detector 271 is configured to evaluate the phishing login-fail page by consulting the login-fail page database 272. Because the phishing login-fail page is not legitimate, the phishing login-fail page does not have a corresponding entry in the login-fail page database 272. Accordingly, the phishing detector 271 classifies the phishing login page and phishing login-fail page (and by extension the phishing site 251) as phishing pages. In response, the backend system 260 may so inform the anti-phishing agent 262 (arrow 207). The anti-phishing agent 262 may respond to the information that the phishing login page is a phishing page by displaying a corresponding message, blocking the user from entering credentials into the phishing login page, blocking reception of other webpages from the phishing site 251, etc.

In light of the foregoing, it can be appreciated that all or some of the functionality of the phishing detector 271 may be implemented by the anti-phishing agent 262 on the user computer 252. For example, in response to detecting that the user computer 252 is requesting for or receiving a login page, the anti-phishing agent 262 may prevent the user from interacting with the login page, enter false credentials into the login page, and evaluate the login page for phishing based on whether or not the website serving the login page accepts the false credentials as valid and whether or not the website serves a legitimate login-fail page in response to the entry of the false credentials in the login page as previously explained with reference to the phishing detector 271. The anti-phishing agent 262 may allow the user to enter his credentials into the login page if the login page is classified as legitimate, or prevent the user from interacting with the login page if the login page is classified as a phishing page. In that embodiment, the anti-phishing agent 262 may consult a local or remote login-fail page database to identify legitimate login-fail pages.

Figure 8:
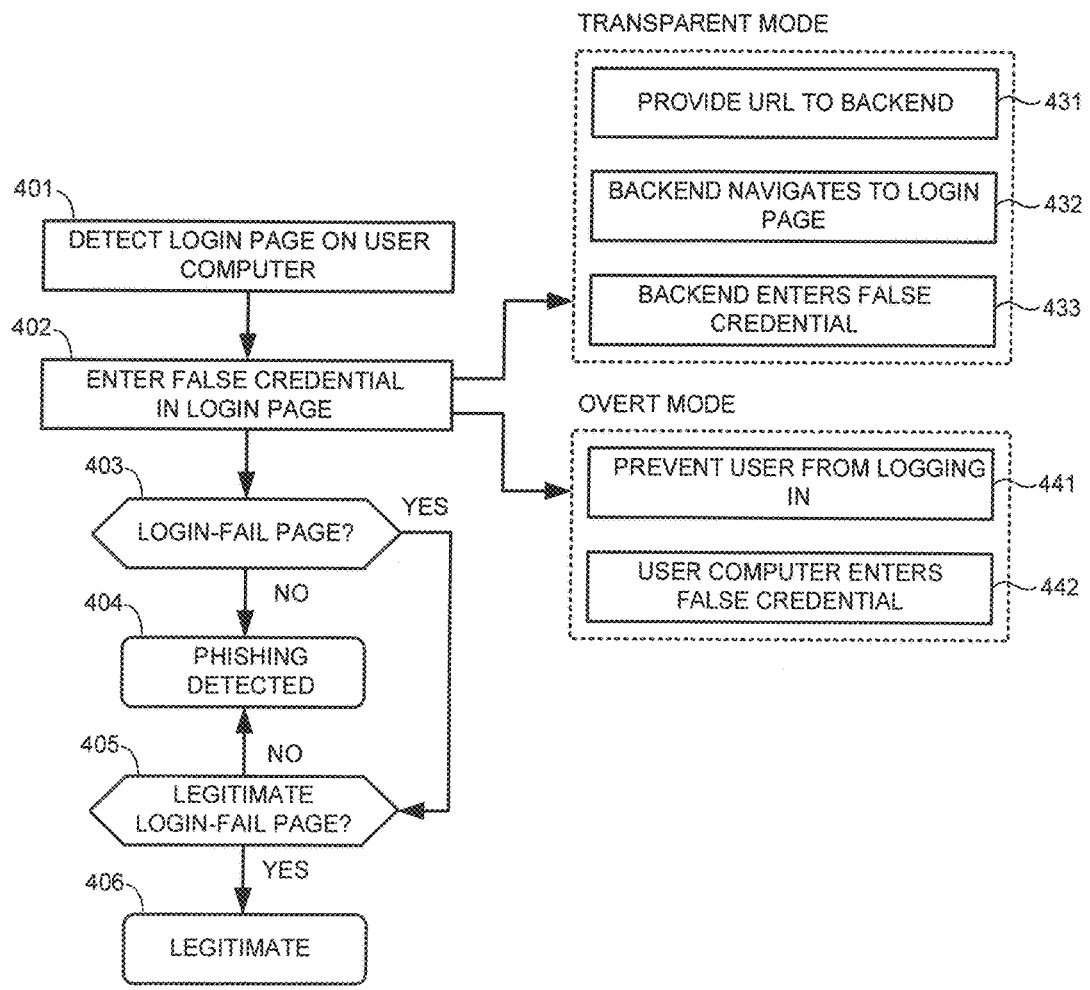
FIG. 8 shows a flow diagram of a method of detecting phishing in accordance with an embodiment of the present invention.

FIG. 8 shows a flow diagram of a method of detecting phishing in accordance with an embodiment of the present invention. The method of FIG. 8 may be performed by the backend system 260 and/or the user computer 252 by running the anti-phishing agent 262 and/or the phishing detector 271 in conjunction with a login-fail page database 272. Other components may also be employed without detracting from the merits of the present invention.

In the example of FIG. 8, a login page is detected on a user computer (step 401). The login page may be detected upon request by the user computer to receive the login page or when the login page is rendered on a web browser running on the user computer. One or more false credentials are entered into the login page as per corresponding entry fields in the login page (step 402). For example, a false user ID and/or a false password may be entered into the login page. The credentials are false in that they do not correspond to an actual online account. In one embodiment, the false credentials are randomly generated.

In one embodiment, the method of FIG. 8 may be performed in transparent mode where the false credentials are entered by a backend system or in overt mode where the false credentials are entered by the user computer. In the example of FIG. 8, in transparent mode, the user computer provides the backend system the URL or other network location identifier of the login page (step 431). The backend system follows the URL to navigate to the login page (step 432) and enters the false credentials into the login page received in the backend system. In the example of FIG. 8, in overt mode, the user computer prevents the user from logging in (step 441) and enters the false credentials in the login page (step 442).

In the example of FIG. 8, the login page received in the user computer is classified as a phishing page depending on whether or not a login-fail page is served to the user computer in response to the entry of false information in the login page (step 403). If the webpage received in the user computer is not a login-fail page (e.g., a login-success page is received instead), the login page and the website that served the login page are classified as phishing, i.e., perpetrating a phishing attack (step 403 to step 404). On the other hand, if the webpage received in the user computer is a login-fail page, the login-fail page is evaluated to determine whether or not it is legitimate (step 403 to step 405). If the login-fail page is not legitimate, e.g., by consulting a database of known legitimate login-fail pages, the login page and the website that served the login page are classified as phishing (step 405 to step 404). Otherwise, the login-fail page is classified as legitimate (step 405 to step 406).

Methods and systems for detecting phishing have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   detecting, in a user computer, a login page of an online service;
   sending a notification from the user computer to a backend system that the login page has been detected in the user computer;

receiving, by the backend system, the login page in the backend system using a network location identifier of the login page included in the notification;

entering, by the backend system, a false credential in the login page received in the backend system to login to the online service;

receiving a login-fail page in the backend system, the login-fail page indicating that the login to the online service using the false credential has failed;

determining, by the backend system, that the login-fail page is not a legitimate login-fail page by comparing the login-fail page to a database of legitimate login-fail pages; and in response to determining that the login-fail page is not legitimate, preventing credentials from being entered into the login page.

2. The computer-implemented method of claim 1, further comprising: informing the user computer that the login page received in the user computer is a phishing page in response to determining that the login-fail page is not legitimate.

3. The computer-implemented method of claim 1, wherein the false credential comprises a false user identifier (ID).

4. The computer-implemented method of claim 1, wherein the false credential comprises a false password.

5. The computer-implemented method of claim 1, wherein the false credential is randomly generated.

6. The computer-implemented method of claim 1, wherein the network location identifier of the login page included in the notification is a uniform resource locator (URL).

7. A system comprising:

a user computer that is configured to receive a login page of an online service and prevent a credential from being entered into the login page when the login page is classified as a phishing page; and a backend system that is configured to receive from the user computer a notification regarding the login page, receive the login page in the backend system in response to receiving the notification, to login to the online service by entering a false credential in the login page received in the backend system, receive a login-fail page that indicates that the login to the online service has failed, evaluate whether or not the login-fail page is legitimate to determine if the login page received in the user computer is a phishing page, and classify the login page as a phishing page when the login-fail page is detected as not legitimate by comparing the login-fail page to a database of legitimate login-fail pages.

8. The system of claim 7, wherein the user computer and the backend system communicate over the Internet.

9. The system of claim 7, wherein the false credential is a false user identifier (ID).

10. The system of claim 7, wherein the false credential is a false password.

11. The system of claim 7, wherein the false credential is randomly generated.

* * * * *